United States Patent
Hilbig et al.

(10) Patent No.: US 12,284,930 B2
(45) Date of Patent: Apr. 29, 2025

(54) CROP DIVIDER WITH AUTOMATIC HEIGHT CONTROL

(71) Applicant: Bourgault Industries Ltd., St. Brieux (CA)

(72) Inventors: David Hilbig, St. Brieux (CA); Gerry Miller, St. Brieux (CA)

(73) Assignee: BOURGAULT INDUSTRIES LTD., St. Brieux (CA)

( * ) Notice: Subject to any disclaimer, the term of this patent is extended or adjusted under 35 U.S.C. 154(b) by 572 days.

(21) Appl. No.: 17/713,296

(22) Filed: Apr. 5, 2022

(65) Prior Publication Data

US 2023/0309432 A1 Oct. 5, 2023

(51) Int. Cl.
| | |
|---|---|
| A01B 63/00 | (2006.01) |
| A01B 63/10 | (2006.01) |
| A01B 63/12 | (2006.01) |
| A01D 65/08 | (2006.01) |

(52) U.S. Cl.
CPC ............ *A01B 63/008* (2013.01); *A01D 65/08* (2013.01); *A01B 63/10* (2013.01); *A01B 63/12* (2013.01)

(58) Field of Classification Search
CPC .................. A01B 63/008; A01B 63/10; A01B 63/11–1112; A01B 63/12; A01B 63/24; A01D 65/00–08

See application file for complete search history.

(56) References Cited

U.S. PATENT DOCUMENTS

| | | | |
|---|---|---|---|
| 5,862,657 A | 1/1999 | Saurette | |
| 5,974,773 A * | 11/1999 | Rieck et al. ........... | A01D 63/04 56/320 |
| 6,024,178 A * | 2/2000 | Pickett et al. ......... | A01D 45/22 171/134 |
| 6,282,876 B1 * | 9/2001 | Patterson ............... | A01D 65/08 56/119 |
| 2015/0359177 A1 | 12/2015 | Richard et al. | |
| 2017/0013777 A1 | 1/2017 | Posselius et al. | |

(Continued)

FOREIGN PATENT DOCUMENTS

CA 2269479 3/2004

OTHER PUBLICATIONS

Canadian Examination Search Report for CA 3,154,543 dated Jun. 18, 2024, 6 pages.

(Continued)

*Primary Examiner* — Tara Mayo
(74) *Attorney, Agent, or Firm* — Frost Brown Todd LLP

(57) ABSTRACT

An agricultural implement operating on a field surface with growing crop plants comprises a plurality of divider mechanisms mounted in front of the implement wheels. Each divider mechanism comprises a divider member comprising a diversion member tapering laterally from a front end of the divider member, operative to push the crop plants away from a path of the wheel, and mounted to the implement by a parallel link assembly. An actuator is connected to the parallel link assembly and moves the divider member up and down. A control is operative to activate each actuator, and a sensor system senses a divider height of each divider member above the field surface. The sensor system is connected to the control such that the control is operative to specify a desired divider height for each divider member.

30 Claims, 3 Drawing Sheets

(56) References Cited

U.S. PATENT DOCUMENTS

2019/0230841 A1\* 8/2019 Walker et al. ....... A01D 45/021
2019/0230856 A1 8/2019 Dighton et al.

OTHER PUBLICATIONS

"A Premium Crop Divider", Web page, <https://www.cp.silvertec.ca/>, 5 pages, Jan. 8, 2022, retrieved from the Internet Archive with Google Wayback Machine and accessed on Aug. 14. 2024.

\* cited by examiner

CROP DIVIDER WITH AUTOMATIC HEIGHT CONTROL

FIELD OF THE INVENTION

This disclosure relates to the field of agricultural implements and in particular a crop divider to reduce damage from wheel of an agricultural implement.

BACKGROUND

Crop dividers are well known in agriculture for reducing damage to crops from the wheels of agricultural implements such as sprayers and the like where the implement must pass over a standing crop that has grown to a significant height. Such crop dividers are disclosed for example in Canadian Patent Number 2,269,479 to Dekoning and U.S. Pat. No. 5,974,773 to Rieck et al.

The Dekoning divider includes a biasing element and a dampening element so the divider essentially floats over the ground and any obstacles. The Rieck divider includes a ground engageable shoe that rotates downwardly about a generally horizontal axis relative to the rest of the crop divider assembly. The ground engageable shoe is retained in operating position by gravity and a link system such that upon engaging an obstruction the ground engageable shoe rotates downwardly about its axis of rotation thereby activating the link system which lifts the entire divider and ground engageable shoe clear of the obstruction.

U.S. Pat. No. 5,862,657 to Saurette discloses a crop divider that is pivotally attached to the axle of an agricultural implement and rides on a wheel near the front which rides over obstructions and sets the height of the divider.

SUMMARY OF THE INVENTION

The present disclosure provides an agricultural apparatus for reducing damage to crop plants growing on a field surface that overcomes problems in the prior art.

In a first embodiment the present disclosure provides an agricultural apparatus for reducing damage to crop plants growing on a field surface. The apparatus comprises an agricultural implement mounted on implement wheels and operating on the field surface. The apparatus comprises a plurality of divider mechanisms, each divider mechanism mounted in front of one of the implement wheels. Each divider mechanism comprises a divider member comprising a diversion member tapering laterally from a front end of the divider member to a rear end of the divider member and operative to push the crop plants away from a path of the wheel, and a parallel link assembly comprising upper and lower arms pivotally attached at rear ends of the upper and lower arms to the agricultural implement and pivotally attached at front ends of the upper and lower arms to the divider member such that the upper and lower arms remain parallel to each other as the divider member moves up and down, and an actuator connected to the parallel link assembly and operative to move the divider member up and down. A control is located adjacent to an operator's station and is operative to activate each actuator to selectively move each of the divider members up and down, and a sensor system is operative to sense a divider height of each divider member above the field surface. The sensor system is connected to the control such that the control when in a field mode is operative to specify a desired divider height for each divider member that is between a minimum divider height and a maximum divider height and operate each actuator to maintain the desired divider height for each divider member.

In a second embodiment the present disclosure provides a method of operating crop divider apparatus attached in front of a wheel of an agricultural implement operating on a field surface with crop plants growing on the field surface. The method comprises providing a divider member comprising diversion member tapering laterally from a front end of the divider member to a rear end of the divider member and operative to push the crop plants away from a path of the wheel; providing a parallel link assembly comprising upper and lower arms pivotally attached at rear ends of the upper and lower arms to the agricultural implement and pivotally attached at front ends of the upper and lower arms to the divider member such that the upper and lower arms remain parallel to each other as the divider member moves up and down; connecting an actuator to the parallel link assembly, the actuator operative to move the divider member up and down; locating a control adjacent to an operator's station on the agricultural implement and connecting the control to the actuator, and operating the control to activate the actuator to selectively move the divider member up and down; providing a sensor system operative to sense a divider height of the divider member above the field surface, wherein the sensor system is connected to the control such that the control, when in a field mode, is operative to specify a desired divider height for the divider member that is between a minimum divider height and a maximum divider height and operate each actuator to maintain the desired divider height for the divider member.

The present disclosure provides an agricultural apparatus for reducing damage to crop plants growing on a field surface. The divider members can be moved up and down together or independently, and each divider member can be positioned at a selected height, either relative to the field surface or, where the sensor system includes a crop sensor, to the crop height. Obstacles can be detected and the divider members can be immediately and automatically raised to avoid damage.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
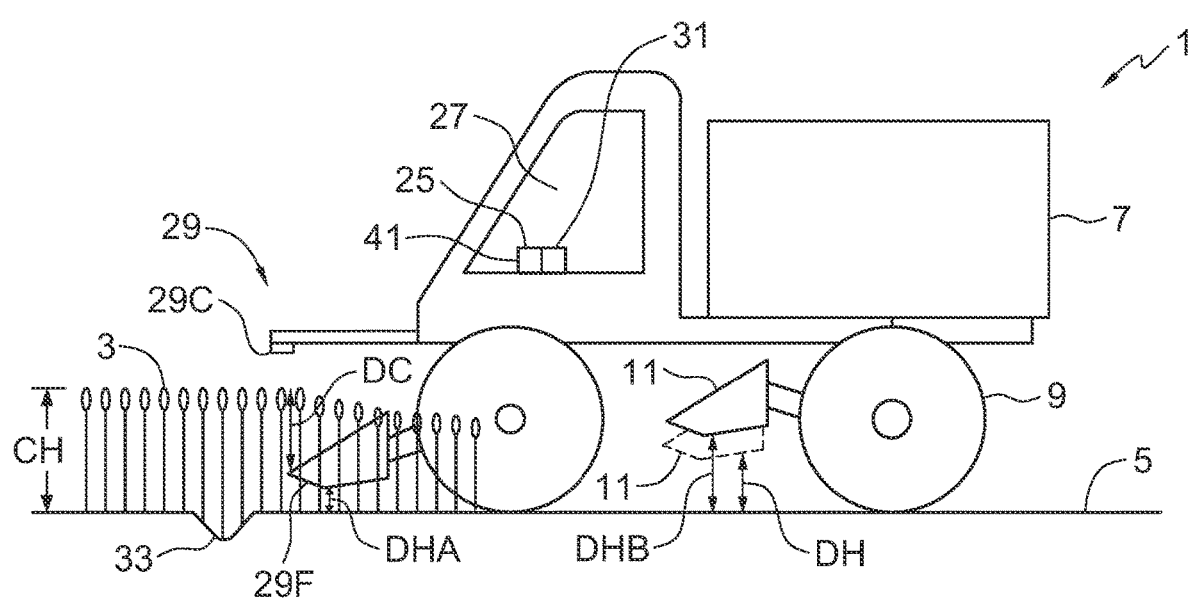
FIG. 1 is a schematic side view of an embodiment of the apparatus of the present disclosure.
Figure 2:
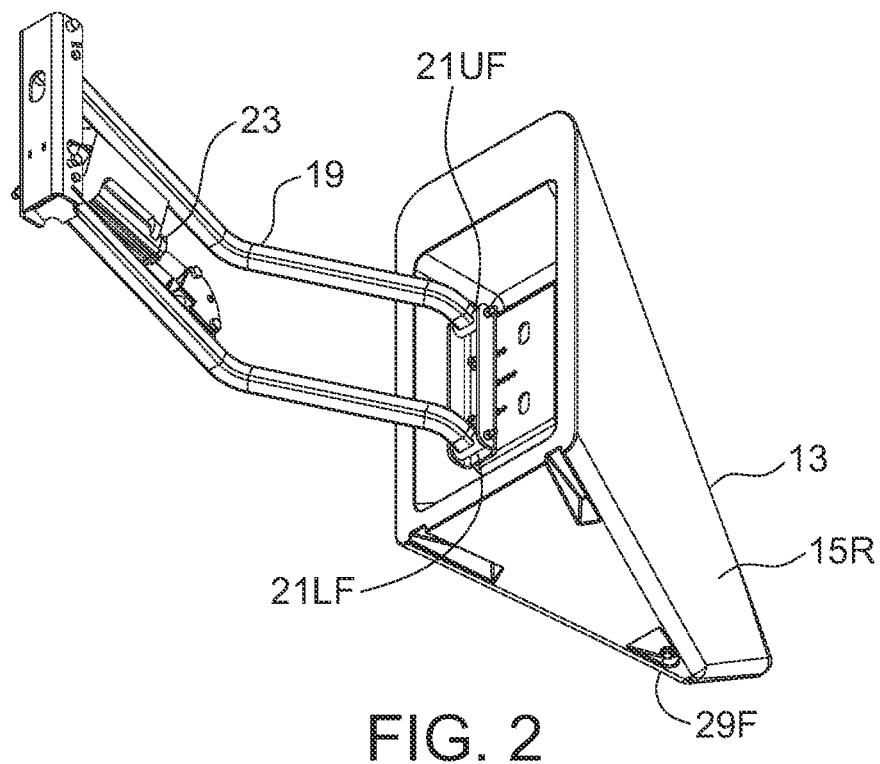
FIG. 2 is a bottom perspective view of a divider mechanism of the embodiment of FIG. 1.
Figure 3:
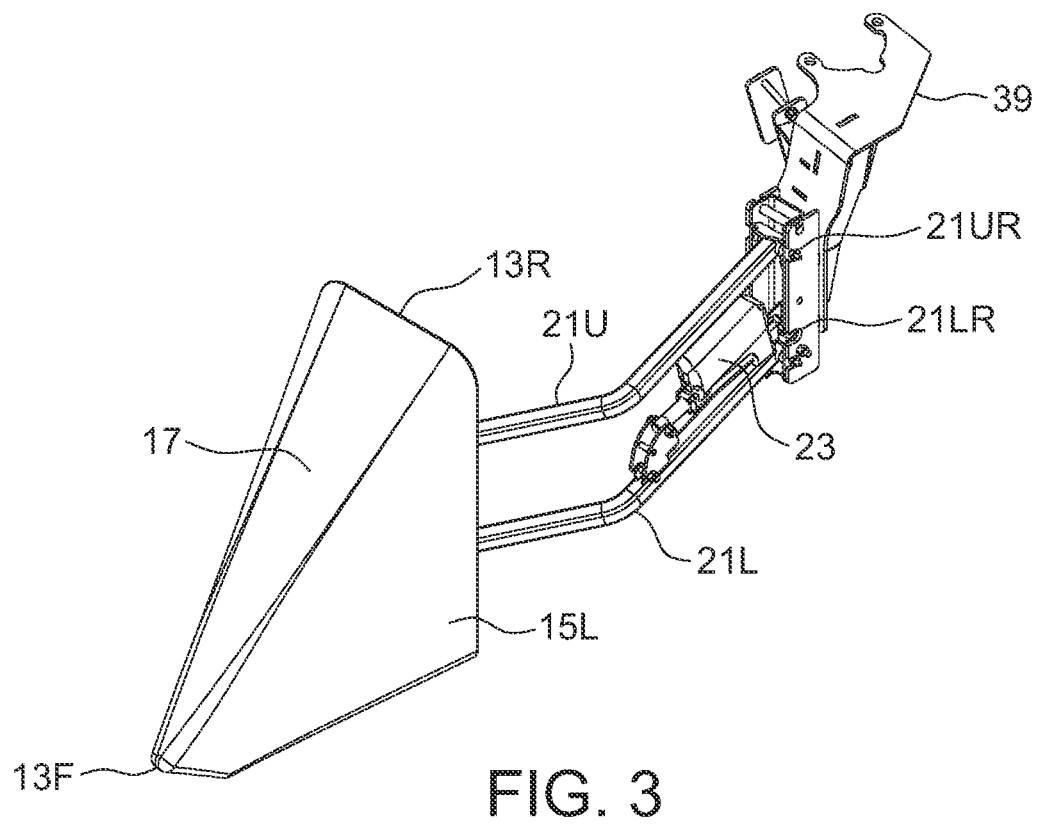
FIG. 3 is a top perspective view of a divider mechanism of the embodiment of FIG. 1.

FIG. 1 illustrates an embodiment of an agricultural apparatus 1 of the present disclosure for reducing damage to crop plants 3 growing on a field surface 5. The apparatus comprises an agricultural implement 7 mounted on implement wheels 9 and a plurality of divider mechanisms 11 as shown in FIGS. 2 and 3. Each divider mechanism 11 is mounted in front of one of the implement wheels 9 and comprises a divider member 13 comprising a diversion member tapering laterally from a front end of the divider member to a rear end of the divider member 13. The divider member 13 shown in FIG. 1-4 comprises right and left sidewalls 15R, 15L and a top wall 17 tapering outward and upward from a front end 13F of the divider member 13 to a rear end 13R of the divider member 13.

A parallel link assembly 19 comprises upper and lower arms 21U, 21L pivotally attached at rear ends 21UR, 21LR of the upper and lower arms to the agricultural implement 7 and pivotally attached at front ends 21UF, 21LF of the upper and lower arms to the divider member 13 such that the upper and lower arms remain parallel to each other as the divider member moves up and down, and such that the divider member 13 moves up and down without changing its angle to the field surface. The divider mechanism 11 also includes an actuator 23 that is connected to the parallel link assembly 19 and is operative to move the divider member 13 up and down. The actuator 23 illustrated is provided by an extendable actuator activated by electric or hydraulic power.

Figure 4:
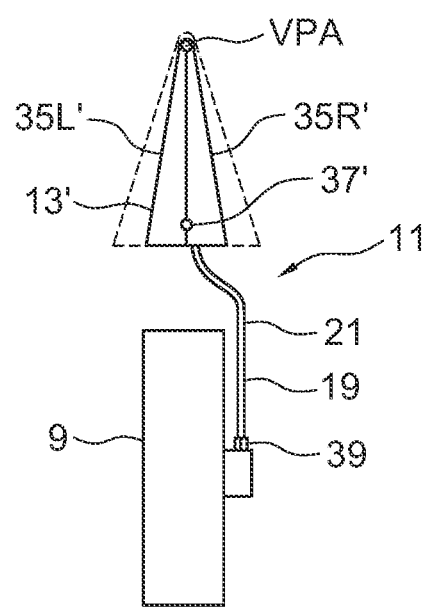
FIG. 4 is a schematic top view of an alternate divider member suitable for use with the embodiment of FIG. 1.

The upper and lower arms 21 are bent as shown so the parallel link assembly 19 can be mounted to the agricultural implement 7 inside the implement wheels 9 and then the arms 21 can bend to the right or left to cover the implement wheel 9 itself as seen in FIG. 4.

A control 25 is located adjacent to an operator's station 27 and is operative to activate each actuator 23 to selectively move each of the divider members 13 up and down. A sensor system 29 is operative to sense a divider height DH of each divider member 13 above the field surface 5. The sensor system 29 is connected to the control 25 such that the control 25, when in a field mode, is operative to specify a desired divider height DH for each divider member 13 that is between a minimum divider height DHA and a maximum divider height DHB and operate each actuator 23 to maintain the desired divider height DH for each divider member 13.

It may be desired to operate with the divider members 13 at different heights DH and the control can be programmed to set a separate desired divider height for each of the divider member 13. An indicator 31 adjacent to the operator's station 27 is connected to the sensor system 29 and is operative to indicate each divider height DH to an operator.

The sensor system 29 comprises a field sensor 29F located in a front portion of each divider member 13 operative to detect the divider height DH of each divider member 13. The field sensor 29F at the front location is also operative to detect an obstacle 33 in a path of one of the divider members 13 and to operate the corresponding actuator 23 to move the corresponding divider member 13 to the maximum divider height DHB to avoid damage to the divider mechanism 11.

The sensor system 29 also comprises a crop sensor 29C operative to sense a crop height CH of the crop plants 3. The crop sensor 29C is connected to the control 25 such that the control 25, when in a crop mode, is operative to operate each actuator 23 to maintain a desired distance DC between the crop height CH and each divider member 13 that is within the range between the minimum divider height DHA and the maximum divider height DHB.

The crop height CH can vary significantly across a field surface 5 and it may be desirable to control the height of the divider members 13 according to the crop height CH rather than to the field surface 5.

The field sensor 29F is located in a front portion of each divider member 13, and the crop sensor 29C is attached to the agricultural implement 7 at a location that is above the crop height CH. In typical operation the control 25 in the field mode reads information from the field sensors 29F, and the control 25 when in the crop mode reads information from both the crop sensor 29 to set the divider height DH relative to the crop height CH and also reads the field sensors 29F to avoid obstacles.

As shown in FIG. 4 the divider member 13 can be adjusted for implement wheels of different widths. The divider member 13' comprises overlapping right and left divider portions 35R', 35L' pivotally attached at the front end of the divider member 13' about a substantially vertical pivot axis VPA. The overlapping right and left divider portions 35R', 35L' can then be pivoted about the pivot axis VPA and then fastened together with a fastener 37' and be fixed to each other at an adjustable width to accommodate the implement wheel 9.

Obstacle detection is a significant object of the field sensor 29F as the divider mechanisms 11 can be quite readily damaged. Where an obstacle 33 is a ditch or the like on a field surface 5 that is known and always in the same place a field location device 41, such as GPS or the like, can be connected to the control 25 such that the control 25 is further operative to raise and then lower each divider member when the ditch is encountered on a succeeding pass with an implement. Similar uses may also be made on the basis of information from prior passes over the field surface 5.

Figure 5:
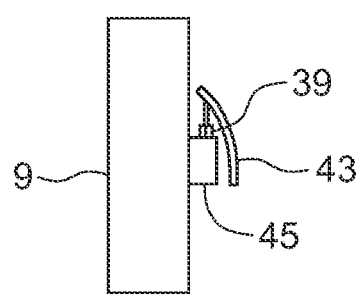
FIG. 5 is a schematic top view of a shield to reduce crop damage when the divider mechanism is removed.

Each divider mechanism 11 is connected to the agricultural implement 7 by a bracket 39, and the divider mechanism 11 can be removed and replaced by a shield 43 as shown in FIG. 5 to reduce crop damage from the wheel mount 45.

Figure 6:
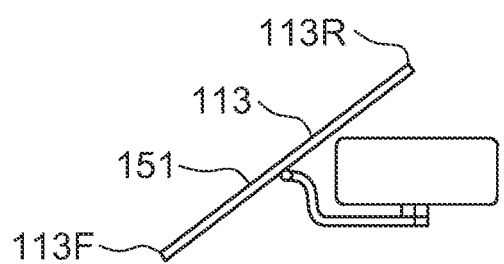
FIG. 6 is a schematic top view of an alternate divider member for use with the embodiment of FIG. 1.
Figure 7:
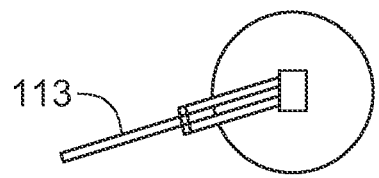
FIG. 7 is a side view of the divider member of FIG. 6.

FIGS. 6 and 7 show a divider member 113 that comprises a single diversion member 151 tapering laterally from a front end 113F of the divider member to a rear end 113R of the divider member 131.

Figure 8:
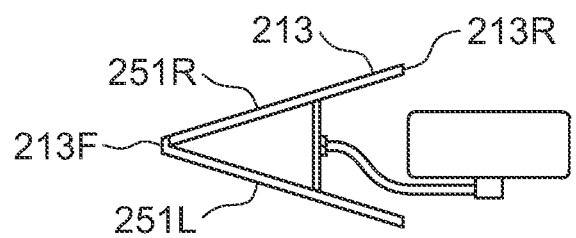
FIG. 8 is a schematic top view of a further alternate divider member for use with the embodiment of FIG. 1.
Figure 9:
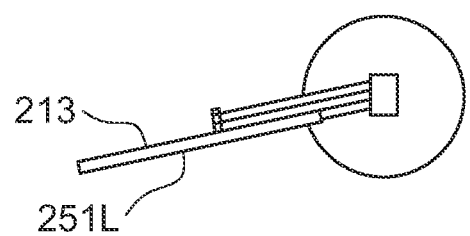
FIG. 9 is a side view of the divider member of FIG. 8.

FIGS. 8 and 9 show a divider member 213 with right and left diversion members 251R, 251L tapering laterally outward to the right and left from the front end 213F of the divider member to the rear end 213R of the divider member.

The present disclosure further provides a method of operating crop divider apparatus attached in front of a wheel 9 of an agricultural implement 7 operating on a field surface 5 with crop plants 3 growing on the field surface 5. The method comprises providing a divider member 13 comprising a diversion member tapering laterally from a front end of the divider member to a rear end of the divider member and operative to push the crop plants away from a path of the wheel; providing a parallel link assembly 19 comprising upper and lower arms 21U, 21L pivotally attached at rear ends 21UR, 21LR of the upper and lower arms to the agricultural implement 7 and pivotally attached at front ends 21UF, 21LF of the upper and lower arms to the divider member 13 such that the upper and lower arms 21 remain parallel to each other as the divider member 31 moves up and down; connecting an actuator 23 to the parallel link assembly 19, the actuator 23 operative to move the divider member 13 up and down; locating a control 25 adjacent to an operator's station 27 on the agricultural implement 7 and connecting the control 25 to the actuator 23, and operating the control 25 to activate the actuator to selectively move the divider member up and down; providing a sensor system 29 operative to sense a divider height DH of the divider member 13 above the field surface 5, wherein the sensor system 29 is connected to the control 25 such that the control, when in a field mode, is operative to specify a desired divider height DH for the divider member that is between a minimum divider height DHA and a maximum divider height DHB and operate the actuator 23 to maintain the desired divider height for the divider member.

The present disclosure provides an agricultural apparatus 1 for reducing damage to crop plants 3 growing on a field surface 5. The divider members 13 can be moved up and down together or independently, and each divider member 13 can be positioned at a selected height, either relative to the field surface 5 or, where the sensor system includes a crop sensor 29C, to the crop height CH. Obstacles can be detected and the divider member 13 can be immediately and automatically raised to avoid damage.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural apparatus for reducing damage to crop plants growing on a field surface, the apparatus comprising:
    an agricultural implement mounted on implement wheels and operating on the field surface;
    a plurality of divider mechanisms, each divider mechanism mounted in front of one of the implement wheels and comprising:
        a divider member comprising a diversion member tapering laterally from a front end of the divider member to a rear end of the divider member and operative to push the crop plants away from a path of the implement wheel;
        an actuator operative to move the divider member up and down;
    a control located adjacent to an operator's station and operative to activate each actuator to selectively move each of the divider members up and down;
    a sensor system operative to sense a divider height of at least one of the divider members above the field surface, wherein the sensor system is connected to the control such that the control when in a field mode is operative to specify a desired divider height for at least one of the divider members that is between a minimum divider height above the field surface and a maximum divider height above the field surface and operate each actuator to maintain the desired divider height for at least one of the divider members.

2. The apparatus of claim 1 wherein the divider member comprises a right diversion member tapering laterally outward to a right side from the front end of the divider member to the rear end of the divider member and a left diversion member tapering laterally outward to a left side from the front end of the divider member to the rear end of the divider member.

3. The apparatus of claim 2 wherein the right and left diversion members comprise right and left side walls tapering outward and upward and the divider member further comprises a top wall tapering upward and outward from the front end of the divider member to the rear end of the divider member.

4. The apparatus of claim 1 wherein the divider member comprises right and left overlapping divider portions pivotally attached at the front end of the divider member about a substantially vertical pivot axis and wherein the right and left overlapping divider portions are fixed to each other at an adjustable width.

5. The apparatus of claim 1 comprising an indicator adjacent to the operator's station and connected to the sensor system and operative to indicate each divider height to an operator.

6. The apparatus of claim 1 wherein the sensor system comprises a field sensor located in a front portion of each divider member.

7. The apparatus of claim 6 wherein the field sensor is operative to detect an obstacle in a path of one of the divider members and to operate the corresponding actuator to move the corresponding divider member to the maximum divider height.

8. The apparatus of claim 6 wherein the sensor system comprises a crop sensor operative to sense a crop height of the crop plants.

9. The apparatus of claim 8 wherein the crop sensor is connected to the control such that the control when in a crop mode is operative to operate each actuator to maintain a desired distance between the crop height and each divider member that is within a range between the minimum divider height and the maximum divider height above the field surface.

10. The apparatus of claim 9 wherein the control in the field mode reads information from the field sensors, and the control in the crop mode reads information from the crop sensor and the field sensors.

11. The apparatus of claim 8 wherein the field sensor is located in a front portion of each divider member, and the crop sensor is attached to the agricultural implement at a location that is above the crop height.

12. The apparatus of claim 1 wherein the actuator 1s provided by an extendable actuator activated by electric or hydraulic power.

13. The apparatus of claim 1 comprising a field location device connected to the control and the control is further operative to raise and lower each divider member on the basis of information from prior passes over the field.

14. The apparatus of claim 1 wherein each divider mechanism is connected to the agricultural implement by a bracket, and wherein each divider mechanism can be removed and replaced by a shield to reduce crop damage.

15. The apparatus of claim 1 further comprising a parallel link assembly comprising upper and lower arms pivotally attached at rear ends of the upper and lower arms to the agricultural implement and pivotally attached at front ends of the upper and lower arms to at least one of the divider members such that the upper and lower arms remain parallel to each other as the at least one of the divider members moves up and down, and wherein the corresponding actuator is connected to the parallel link assembly.

16. The apparatus of claim 1 wherein a width of the divider member extends greater than a width of the path of the implement wheel.

17. A method of operating crop divider apparatus attached in front of a wheel of an agricultural implement operating on a field surface with crop plants growing on the field surface, the method comprising:
    providing a divider member comprising a diversion member tapering laterally from a front end of the divider member to a rear end of the divider member and operative to push the crop plants away from a path of the wheel;

operatively connecting an actuator to the divider member, the actuator operative to move the divider member up and down;

locating a control adjacent to an operator's station on the agricultural implement and connecting the control to the actuator, and operating the control to activate the actuator to selectively move the divider member up and down; and providing a sensor system operative to sense a divider height of at least one of the divider members above the field surface, wherein the sensor system is connected to the control such that the control, when in a field mode, is operative to specify a desired divider height for the at least one of the divider members that is between a minimum divider height and a maximum divider height and operate each actuator to maintain the desired divider height for the at least one of the divider members.

18. The method of claim 17 wherein the divider member comprises a right diversion member tapering laterally outward to a left side from the front end of the divider member to the rear end of the divider member and a left diversion member tapering laterally outward to a left side from the front end of the divider member to the rear end of the divider member.

19. The method of claim 18 wherein the right and left diversion members comprise right and left side walls tapering outward and upward and the divider member further comprises a top wall tapering upward and outward from the front end of the divider member to the rear end of the divider member.

20. The method of claim 17 wherein the divider member comprises right and left overlapping divider portions pivotally attached at the front end of the divider member about a substantially vertical pivot axis and wherein the right and left overlapping divider portions are fixed to each other at an adjustable width.

21. The method of claim 17 comprising providing an indicator adjacent to the operator's station and connected to the sensor and operative to indicate the divider height to an operator.

22. The method of claim 17 wherein a field sensor is operative to detect an obstacle in a path of the divider member and to operate the actuator to move the divider to the maximum divider height.

23. The method of claim 22 wherein the field sensor is located in a front portion of the divider member.

24. The method of claim 17 wherein the sensor system comprises a crop sensor operative to sense a crop height of the crop plants.

25. The method of claim 24 wherein the control in a crop mode is operative is operative to operate each actuator to maintain a desired distance between the crop height and each divider member that is within a range between the minimum divider height and the maximum divider height above the field surface and the maximum divider height above the field surface.

26. The method of claim 25 wherein the sensor system comprises a field sensor located in a front portion of the divider member, and a crop sensor attached to the agricultural implement above the height of crop height.

27. The method of claim 26 wherein the control in the field mode reads information from the field sensor, and the control in the crop mode reads information from the crop sensor and the field sensor.

28. The method of claim 17 comprising a field location device connected to the control such that when in a location mode, the control is operative to raise and lower each divider member on the basis of information from prior passes over the field.

29. The method of claim 17 further comprising providing a parallel link assembly comprising upper and lower arms pivotally attached at rear ends of the upper and lower arms to the agricultural implement and pivotally attached at front ends of the upper and lower arms to at least one of the divider members such that the upper and lower arms remain parallel to each other as the at least one of the divider members moves up and down, and wherein the corresponding actuator is connected to the parallel link assembly.

30. The method of claim 17 wherein a width of the divider member extends greater than a width of the path of the implement wheel.

* * * * *